US008152012B1

(12) United States Patent
Berglund

(10) Patent No.: US 8,152,012 B1
(45) Date of Patent: Apr. 10, 2012

(54) REMOVABLE ERGONOMIC HANDLE GRIPPING BABY BOTTLE

(75) Inventor: David Nathan Berglund, Charlotte, NC (US)

(73) Assignee: Edison Nation, LLC, Charlotte, NC (US)

( * ) Notice: Subject to any disclaimer, the term of this patent is extended or adjusted under 35 U.S.C. 154(b) by 755 days.

(21) Appl. No.: 12/185,710

(22) Filed: Aug. 4, 2008

Related U.S. Application Data

(60) Provisional application No. 60/986,571, filed on Nov. 8, 2007, provisional application No. 61/023,866, filed on Jan. 27, 2008, provisional application No. 61/005,019, filed on Dec. 3, 2007.

(51) Int. Cl.
*B65D 23/10* (2006.01)
*A47J 45/06* (2006.01)
*A61J 9/06* (2006.01)

(52) U.S. Cl. ....... 215/396; 215/11.1; 215/395; 220/771; 294/27.1; 16/425

(58) Field of Classification Search .................. 215/295, 215/296, 11.1, 11.6, 398, 395, 396; 248/102; 294/27.1; D24/194, 199; 220/771; 16/425
See application file for complete search history.

(56) References Cited

U.S. PATENT DOCUMENTS

| | | | | |
|---|---|---|---|---|
| 2,033,296 | A * | 3/1936 | Porter | 248/102 |
| 3,058,708 | A * | 10/1962 | Murray et al. | 248/102 |
| D200,819 | S | 4/1965 | Perun | |
| 3,463,536 | A * | 8/1969 | Beyer et al. | 294/31.2 |
| 3,773,287 | A * | 11/1973 | Hechinger | 248/102 |
| 4,050,600 | A | 9/1977 | Jennings | |
| D269,321 | S | 6/1983 | Zannini | |
| 4,387,922 | A * | 6/1983 | Geisinger | 294/31.2 |
| D306,071 | S | 2/1990 | Klitsner | |
| D306,072 | S | 2/1990 | Klitsner | |
| D306,073 | S | 2/1990 | Klitsner | |
| D306,074 | S | 2/1990 | Klitsner | |
| D306,075 | S | 2/1990 | Klitsner | |
| 4,943,017 | A * | 7/1990 | Ennis | 248/102 |
| 4,984,697 | A | 1/1991 | Kelly | |
| D315,959 | S | 4/1991 | Bilangi | |
| D322,128 | S | 12/1991 | Martinez | |
| 5,072,843 | A | 12/1991 | James | |
| 5,114,374 | A | 5/1992 | Estiva | |
| 5,178,291 | A * | 1/1993 | Piercey | 215/11.1 |
| D334,983 | S | 4/1993 | Nicholls | |

(Continued)

OTHER PUBLICATIONS

David Nathan Berglund, U.S. Appl. No. 29/302,881, filed Jan. 27, 2008.

(Continued)

*Primary Examiner* — Sue Weaver

(74) *Attorney, Agent, or Firm* — Tillman Wright, PLLC; Chad D. Tillman; James D. Wright

(57) ABSTRACT

A handle for gripping a container includes a circumferential portion and a plurality of arm portions. The circumferential portion defines an opening configured to receive therethrough, along an axis of the opening, a container such that the circumferential portion surrounds and grips the container in an interference fit therewith. A plurality of arm portions integral with the circumferential portion extend therefrom in a radial direction relative to the axis of the opening of the circumferential portion. Each of the plurality of arm portions defines an opening configured to receive therethrough one or more fingers of hand for gripping engagement of the handle by the hand, whereby the arm portion defines a handle grip for handling the container.

14 Claims, 16 Drawing Sheets

U.S. PATENT DOCUMENTS

| | | | | | |
|---|---|---|---|---|---|
| 5,480,043 | A | * | 1/1996 | Wingo | 215/11.1 |
| 5,513,885 | A | * | 5/1996 | Joffe | 294/31.2 |
| 5,613,657 | A | | 3/1997 | Olaiz | |
| 5,806,904 | A | * | 9/1998 | Smith | 294/31.2 |
| 5,816,631 | A | * | 10/1998 | Kochan | 294/33 |
| D403,072 | S | | 12/1998 | Rogers Huante | |
| D407,944 | S | | 4/1999 | Filbrun | |
| D411,303 | S | | 6/1999 | Scagliotti | |
| D440,016 | S | | 4/2001 | Thorpe | |
| D458,380 | S | | 6/2002 | Dutil | |
| D458,540 | S | | 6/2002 | Clements et al. | |
| D472,941 | S | | 4/2003 | Manville | |
| 6,827,317 | B1 | | 12/2004 | Maki Risaliti | |
| 6,938,861 | B1 | * | 9/2005 | Ballard et al. | 248/104 |
| 7,216,837 | B2 | | 5/2007 | Pineda | |
| D556,823 | S | | 12/2007 | Lombard | |
| D584,824 | S | | 1/2009 | Berglund | |
| D584,825 | S | | 1/2009 | Berglund | |
| 2005/0004603 | A1 | * | 1/2005 | Desousa et al. | 606/235 |

OTHER PUBLICATIONS

David Nathan Berglund, U.S. Appl. No. 29/302,882, filed Jan. 27, 2008.

* cited by examiner

REMOVABLE ERGONOMIC HANDLE GRIPPING BABY BOTTLE

CROSS-REFERENCE TO RELATED APPLICATION

The present application is a U.S. nonprovisional patent application of, and claims priority under 35 U.S.C. §119(e) to, each of: (1) U.S. provisional patent application Ser. No. 60/986,571, filed Nov. 8, 2007, which provisional patent application is incorporated by reference herein; (2) 61/023,866, filed Jan. 27, 2008, which provisional patent application is incorporated by reference herein; and (3) 61/005,019, filed Dec. 3, 2007.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to removable handles for drinking containers and, in particular, to removable handles for baby bottles.

Known apparatus that are removably attachable to baby bottles are disclosed, for example, in the following U.S. patent references: U.S. Pat. No. 5,072,843; U.S. Pat. No. 5,613,657; U.S. Pat. No. 6,827,317; U.S. Pat. No. 7,216,837; and U.S. Design Pat. No. D334,983.

While these apparatus appear to be suitable for meeting their intended purposes, a need nevertheless is believed to exist for an improved removable handle for a drinking container and, in particular, for an improved removable handle for a baby bottle. This, and other needs, are believed to be addressed by one or more aspects of the present invention.

SUMMARY OF THE INVENTION

The present invention includes many aspects and features. Moreover, while many aspects and features relate to, and are described in, the context of baby bottles, the present invention is not limited to use only in such context, as will become apparent from the following summaries and detailed descriptions of aspects, features, and one or more embodiments of the present invention. Indeed, the present invention has similar applicability to other containers that are held by babies as well as by the old and feeble and others suffering from ailments that inhibit gripping of a body of a container.

Accordingly, in a first aspect of the invention, a handle for gripping a container includes a circumferential portion and a plurality of arm portions. The circumferential portion defines an opening configured to receive therethrough, along an axis of the opening, a container such that the circumferential portion surrounds and grips the container in an interference fit therewith. A plurality of arm portions are integral with the circumferential portion and extend therefrom in a radial direction relative to the axis of the opening of the circumferential portion. Each of the plurality of arm portions defines an opening configured to receive therethrough one or more fingers of hand for gripping engagement of the handle by the hand, whereby the arm portion defines a handle grip for handling the container.

In a feature of this aspect, each of the plurality of arm portions further defines a contoured edge configured to individually receive fingers of the hand therein.

In a feature of this aspect, each of the plurality of arm portions are integrally joined with adjacent arm portions to define an outer perimeter edge of the handle. In this feature, the handle may resemble a steering wheel.

In a feature of this aspect, the handle consists of a generally planar body formed by the circumferential portion and the plurality of arm portions.

In another feature of this aspect, one or more sheets of material define the circumferential portion and the plurality of arm portions.

In a feature of this aspect, none of the plurality of arm portions are integrally joined with adjacent arm portions such that radially extending openings that extend to the circumferential portion are defined between adjacent arm portions.

In a feature of this aspect, the circumferential portion defines a groove that extends about the opening configured to receive the container therethrough, such that the circumferential portion includes upper and lower protracting lips separated by a recess for engaging the container in the interference fit.

In a feature of this aspect, a sheet of material defines the circumferential portion and the plurality of arm portions. In this feature, the material may be Ethylene Vinyl Acetate ("EVA").

In a feature of this aspect, the handle is cut from a sheet of lightweight, water resistant, moldable foam material that defines the circumferential portion and the plurality of arm portions.

In a feature of this aspect, the circumferential portion includes a radial thickness that is not uniform about the opening configured to receive the container therethrough.

In a feature of this aspect, circumferential portion and the plurality of arm portions are defined by two sheets of material joined together along a plane that extends in a radial direction relative to the axis of the opening of the circumferential portion. In this feature, each of the sheets of material may be EVA; each of the sheets of the material may be a lightweight, water resistant, moldable foam material; and each of the sheets of the material has a color different from the other sheet.

In a feature of this aspect, the handle is injection molded. In this feature, the handle is generally planar in extent.

A handle for gripping a container includes a circumferential portion and a plurality of arm portions. The circumferential portion defines an opening configured to receive therethrough, along an axis of the opening, a container such that the circumferential portion surrounds and grips the container in an interference fit therewith. The plurality of arm portions are integral with the circumferential portion and extend therefrom in a radial direction relative to the axis of the opening of the circumferential portion. Each of the plurality of arm portions defines an opening configured to receive therethrough one or more fingers of hand for gripping engagement of the handle by the hand, whereby the arm portion defines a handle grip for handling the container.

In a feature of this aspect, the circumferential portion and the plurality of arm portions are generally coplanar.

In a feature of this aspect, one or more sheets of material define the circumferential portion and the plurality of arm portions.

In another aspect of the invention, a baby bottle assembly includes a baby bottle and a handle mounted on the baby bottle for gripping thereof. The handle has a generally planar body. The handle body includes a circumferential portion defining an opening through which the baby bottle extends in an interference fit with the circumferential portion of the handle, and a plurality of arm portions integral with the circumferential portion and extending therefrom in a radial direction relative to an axis of the baby bottle. Each of the plurality of arm portions defines an opening configured to receive therethrough one or more fingers of a hand for gripping engagement of the handle by the hand, whereby the arm portion defines a handle grip for handling the baby bottle.

In addition to the aforementioned aspects and features of the present invention, it should be noted that the present invention further encompasses the various possible combinations and subcombinations of such aspects and features.

BRIEF DESCRIPTION OF THE DRAWINGS

One or more preferred embodiments of the present invention now will be described in detail with reference to the accompanying drawings, wherein like elements are referred to with like reference numerals.

DETAILED DESCRIPTION

Figure 1:
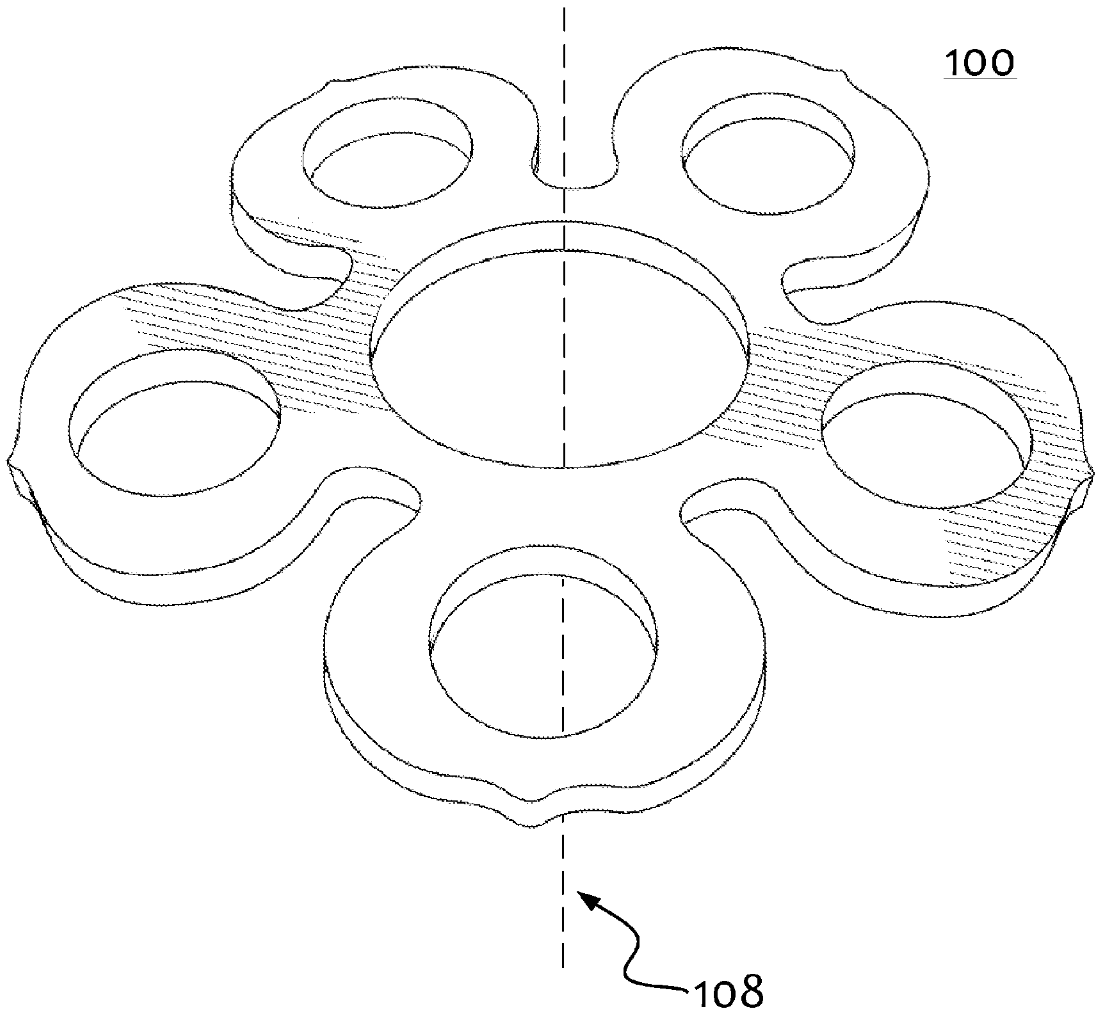
FIG. 1 is a perspective view of a removable ergonomic handle for gripping a bottle in accordance with a first embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

The handle 100 includes a circumferential portion 102 and five appendages or arm portions 104 that are integral with the circumferential portion 102.

The circumferential portion 102 defines an opening 106 that is complete bounded and is configured to receive therethrough, along an axis 108 of the opening 106, a container such as a baby bottle. The opening 106 in the circumferential portion 102 preferably is centrally located relative thereto and preferably is elliptical if not circular in shape. The circumferential portion 102 is designed and dimensioned to surround and grip the baby bottle in an interference fit therewith when positioned on a body of the baby bottle.

The arm portions 104 extend from the circumferential portion 102 in a radial direction relative to the axis 108 of the opening 106 of the circumferential portion 102. The arm section 104 preferably form a repeating circular pattern about the axis 108 of the opening 106.

Each of the plurality of arm portions 104 define an opening 110 that is configured to receive therethrough one or more fingers of hand for gripping engagement of the handle 100 by the hand, whereby the arm portion 104 defines a handle grip 112 for handling a container on which the handle 100 is removably mounted.

The sheet of material defines the circumferential portion 102 and the plurality of arm portions 104. Preferably, the handle 100 is formed by cutting out or stamping the desired shape of the handle 100 from a ¼" (quarter inch) sheet of Ethylene Vinyl Acetate ("EVA"), which is a preferred material because it is a lightweight, water resistant, moldable foam material. Indeed, EVA foam has a smooth soft feel that is inviting to squeeze once it is touched. It is also flexible and resilient so the handle can conform to the precise ergonomic position of the infant user's joint geometry. Because the handle 100 is cutout from a sheet of material, the handle 100 generally is planar in extent, having a relatively minute thickness compared to its overall length and width.

Alternatively, the handle 100 is made in a molding processes, such as an injection molding process.

Handle 100 generally resembles a flower with holes in the pedals.

In use, the flexible material of the handle 100 allows the handle 100 to be install onto a baby bottle without removing a nipple ring from the baby bottle. In particular, the handle 100 may be pulled over the nipple ring and onto the body of the bottle and then slid down the body of the bottle to the desired height. In so doing, the circumferential portion 102 of the handle 100 is slightly expanded and stretched so as to provide an interference fit between the outside diameter of the bottle body and the opening 106 in the circumferential portion 102, whereby the handle 100 and bottle do not readily slide relative to one another during use. The preferred mounting position of the handle 100 is just below the nipple ring of the bottle. In the disposition of the handle 100 on the bottle, a plane of the handle 100 preferably is normal to the axis of the bottle. This puts the handle in an ergonomic position for easy capture and grasp by babies too young to hold a bottle themselves.

Figure 3:
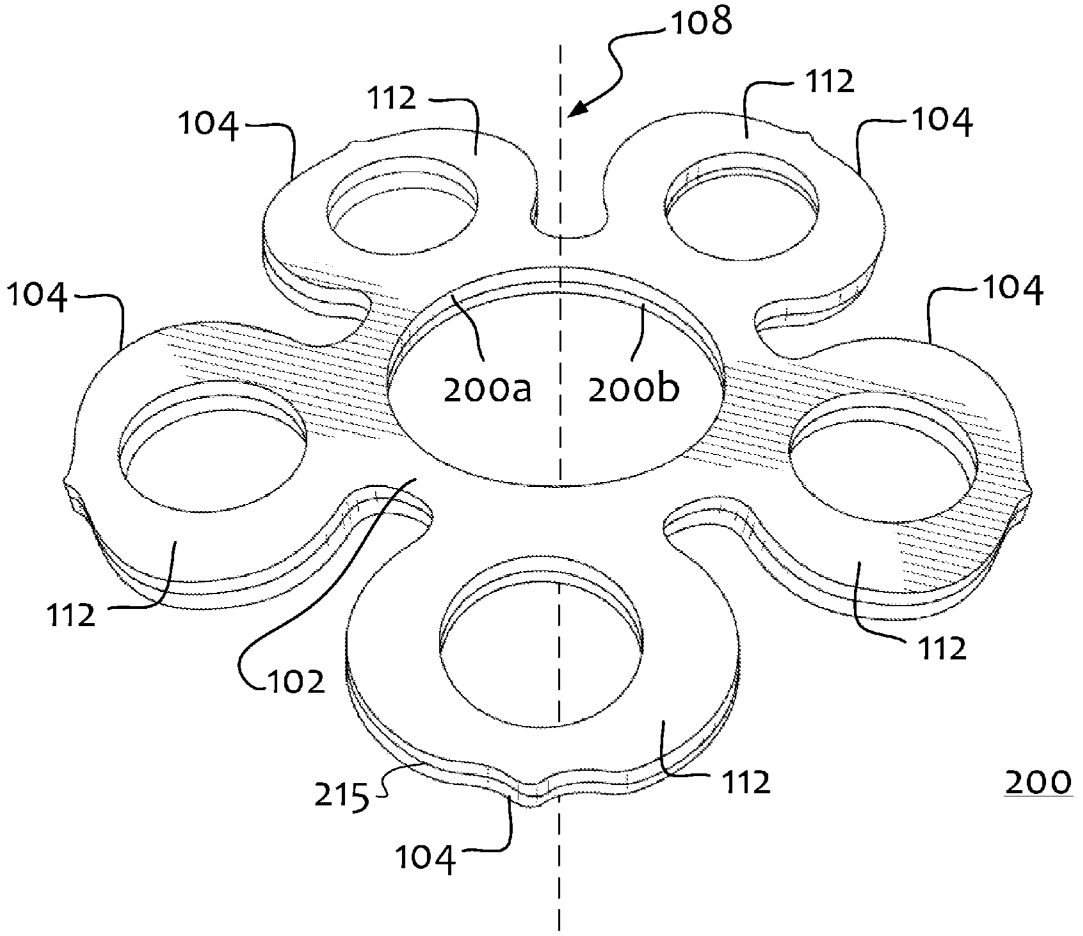
FIG. 3 is a perspective view of a removable ergonomic handle for gripping a bottle in accordance with a second embodiment of the present invention.
Figure 4:
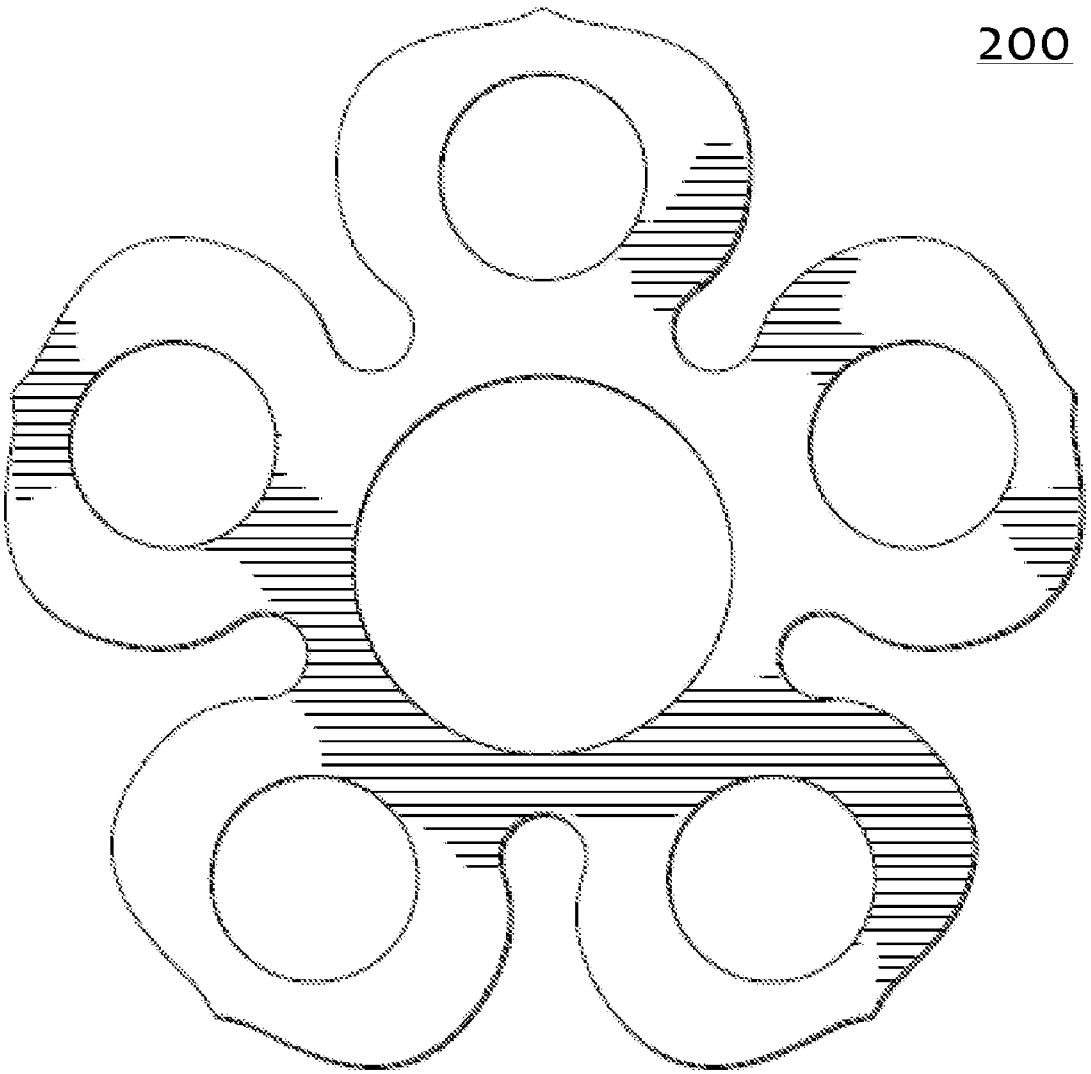
FIG. 4 is a top plan view of the handle of FIG. 3.

A removable ergonomic handle 200 for gripping a bottle that is shown in a perspective view in FIG. 3 and in a top plan view in FIG. 4 is generally similar in design and dimension to handle 100 and, therefore, the differences in structure will be described.

The principal different between handle 100 and handle 200 is the circumferential portion 102 and the arm portions 104 of the handle 200 are defined by two sheets of material joined together along a plane that extends in a radial direction relative to the axis 108 of the opening 106 of the circumferential portion 102. In other words, the two sheets of the material define halves 200*a*,200*b* of the handle 200. Each half 200*a*, 200*b* may be cut or stamped from ⅛" (eighth inch) foam sheet of EVA, and the two halves 200*a*,200*b* can be laminated together to form the handle 200. A demarcation 215 line divides the handle 200 into two the halves 200*a*,200*b*. Each of the sheets of material preferably is Ethylene Vinyl Acetate, and each of the sheets of material preferably has a color that is different from the color of the sheet, whereby the handle 200 consists of halves having two different colors. The demarcation line 215 is intended to represent a border between the two halves 200*a*,200*b*.

Figure 5:
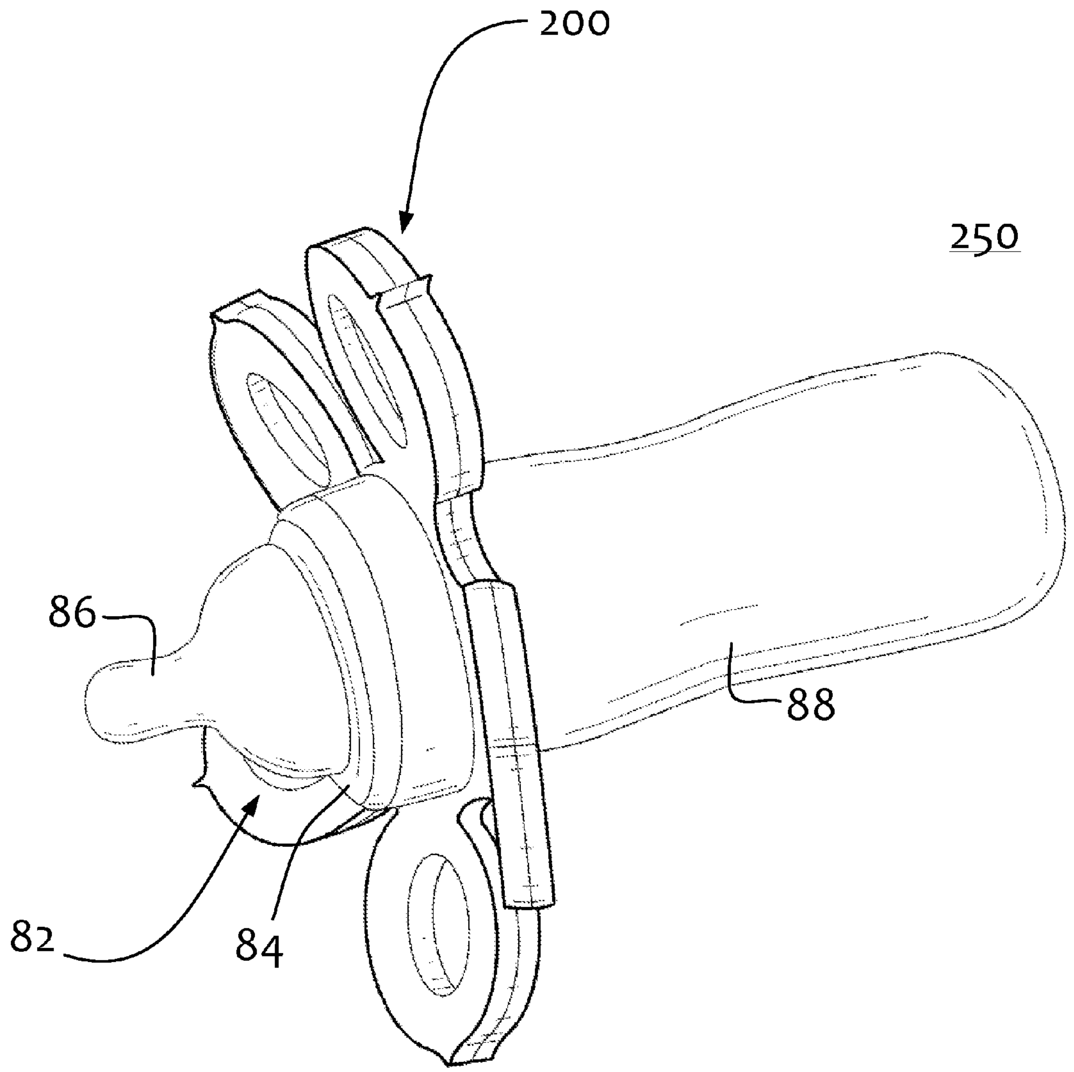
FIG. 5 is a perspective view of the handle of FIGS. 3-4 attached to a baby bottle proximate the nipple ring.
Figure 6:
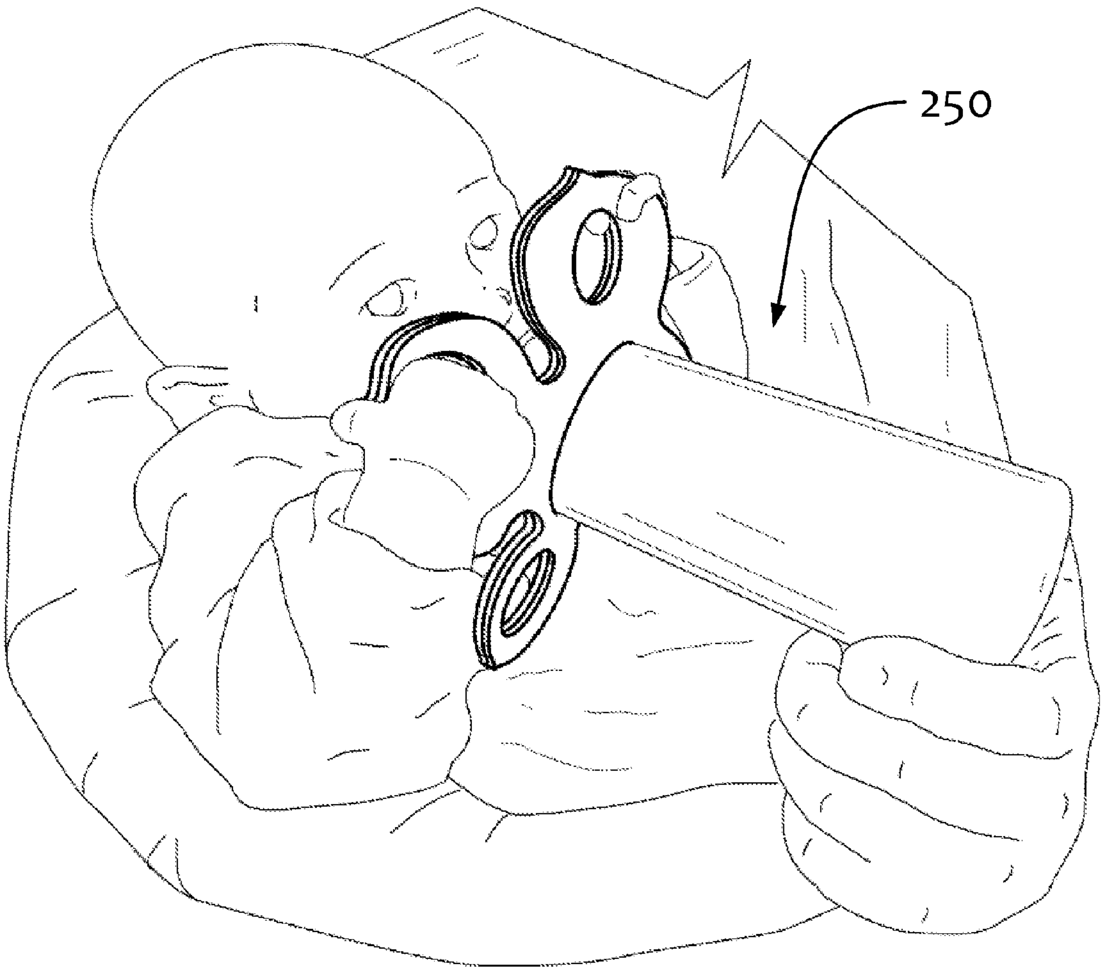
FIGS. 6-7 illustrate perspective views of the handle of FIG. 5 attached to a baby bottle and being used by a baby drinking from the bottle.
Figure 7:
Figure 8:
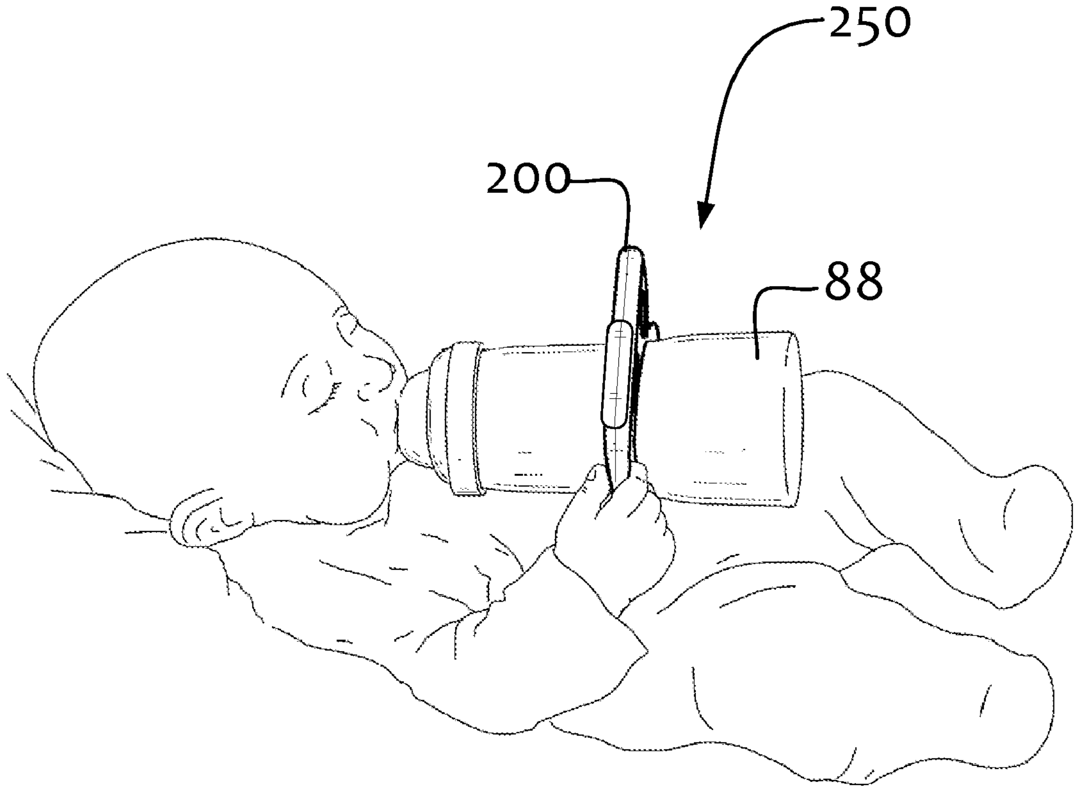
FIG. 8 illustrates the handle of FIGS. 3-4 attached to a baby bottle near the middle of the baby bottle and being used by a baby drinking from the bottle.
Figure 9:
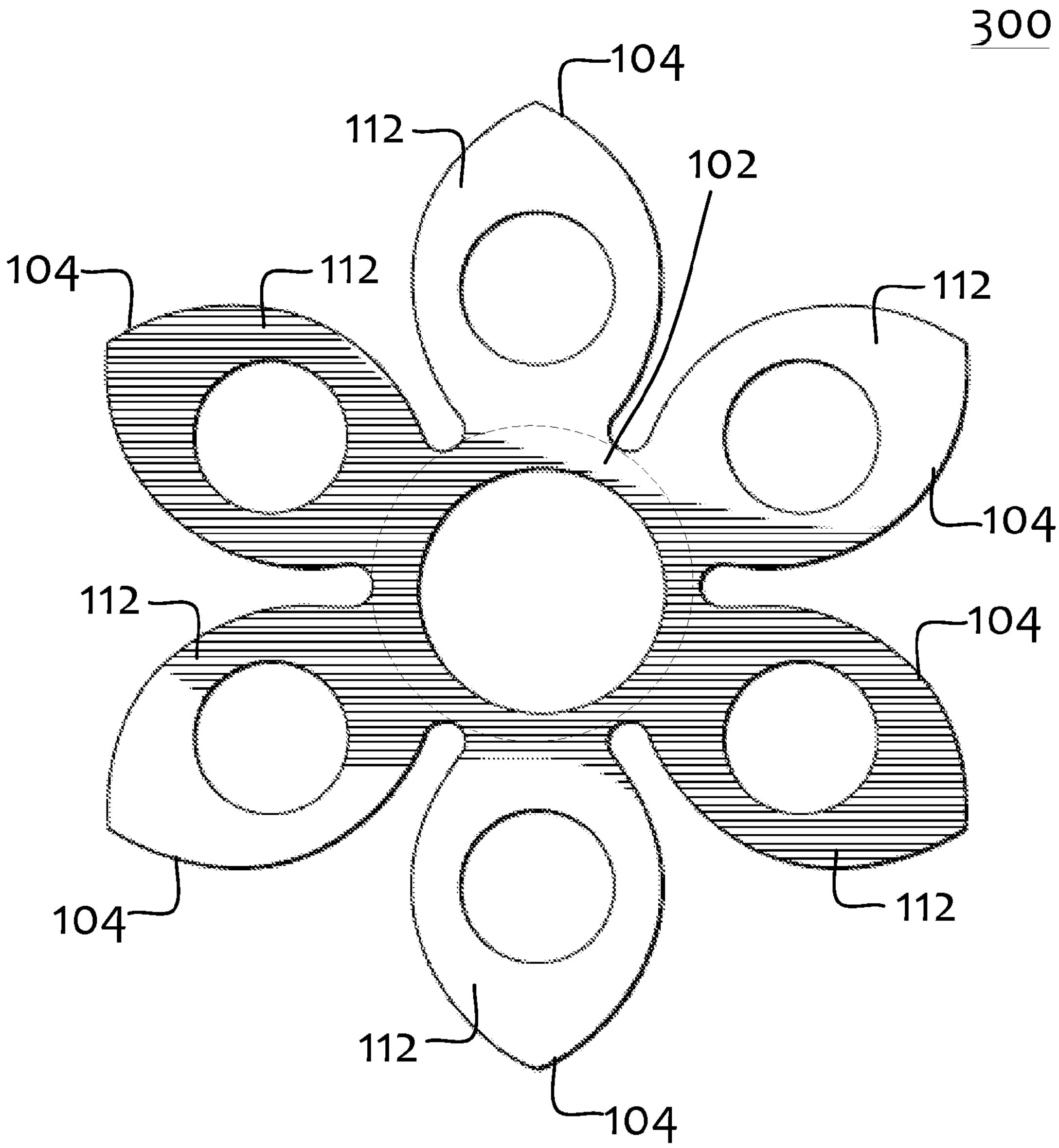
FIG. 9 is a top plan view of a removable ergonomic handle for gripping a bottle in accordance with a third embodiment of the present invention.

A bottle assembly 250 comprising handle 200 and bottle 82 having nipple ring 84 is illustrated in FIG. 5, and uses thereof in feeding an infant are illustrated in FIGS. 6-8. In particular, FIGS. 6-7 illustrate perspective views of the handle 200 attached to the baby bottle 82, wherein the handle 200 is located on the body 88 of the baby bottle 82 proximate the nipple ring 84. The handle 200 is used by a baby drinking from the bottle 82. FIG. 8 illustrates the handle 200 attached to the baby bottle 82 near the middle of the body 88 of the baby bottle 82 and being used by a baby drinking from the bottle 82. The handle 200 is slidable along the bottle 82 and, when in the disposition shown in FIG. 8, the handle 200 tends to keep the nipple 86 of the nipple ring 84 from resting in abutment with the ground if and when the bottle assembly 250 is dropped.

A top plan view of a third removable ergonomic handle 300 for gripping a bottle is illustrated in FIG. 3. The handle 300 is generally similar in design and dimension to handle 100 and principally differences only in that the handle 300 has a circumferential portion 102 and six arm portions 104 rather than five as found in handle 100, and in that the profile of each of the arm portions 104 of handle 300 are somewhat slimmer than the profile of each of the arm portions 104 of handle 100. As such, each of the arm portions 104 of handle 300 generally resembles a leaf, with each leaf including a handle grip 112 for grasping and gripping of the handle.

Figure 10:
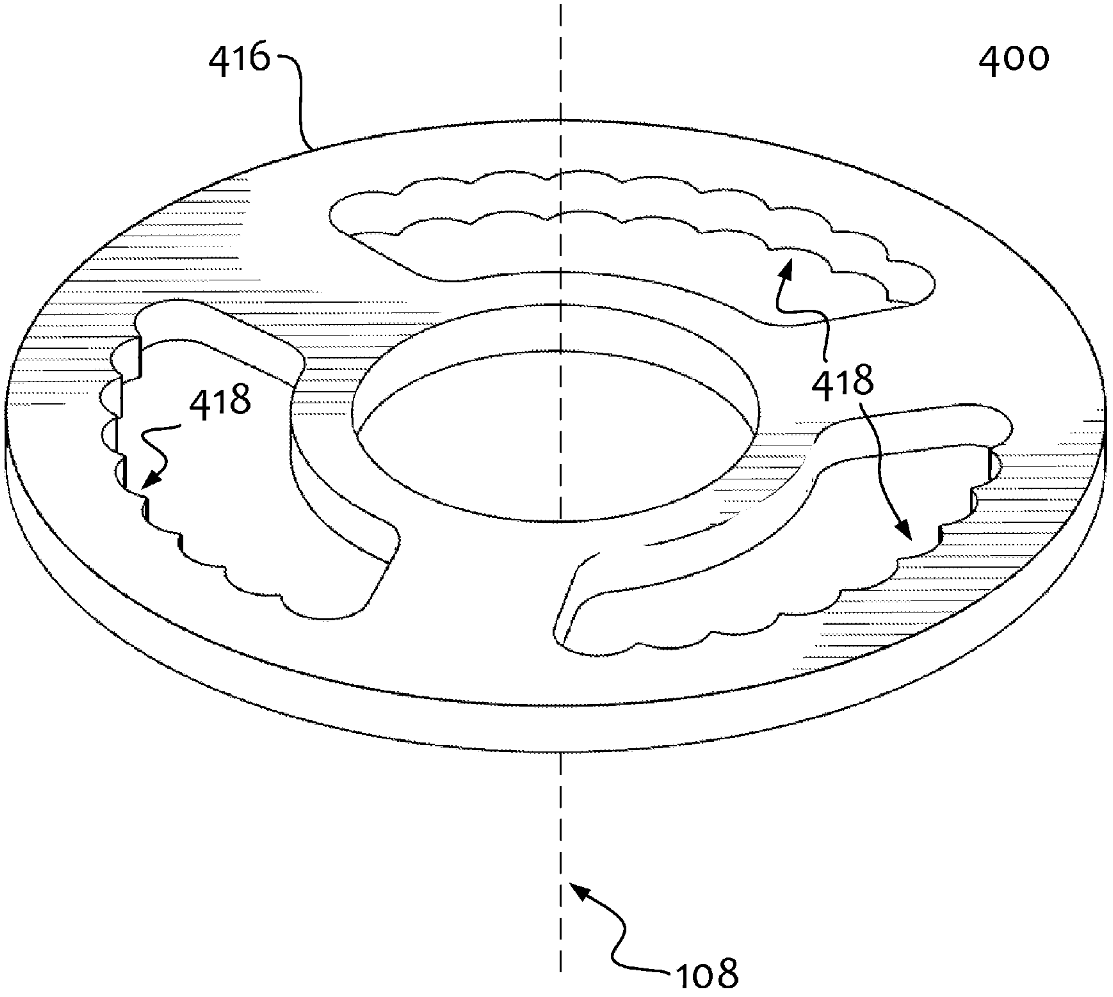
FIG. 10 is a perspective view of a removable ergonomic handle for gripping a bottle in accordance with a fourth embodiment of the present invention.
Figure 11:
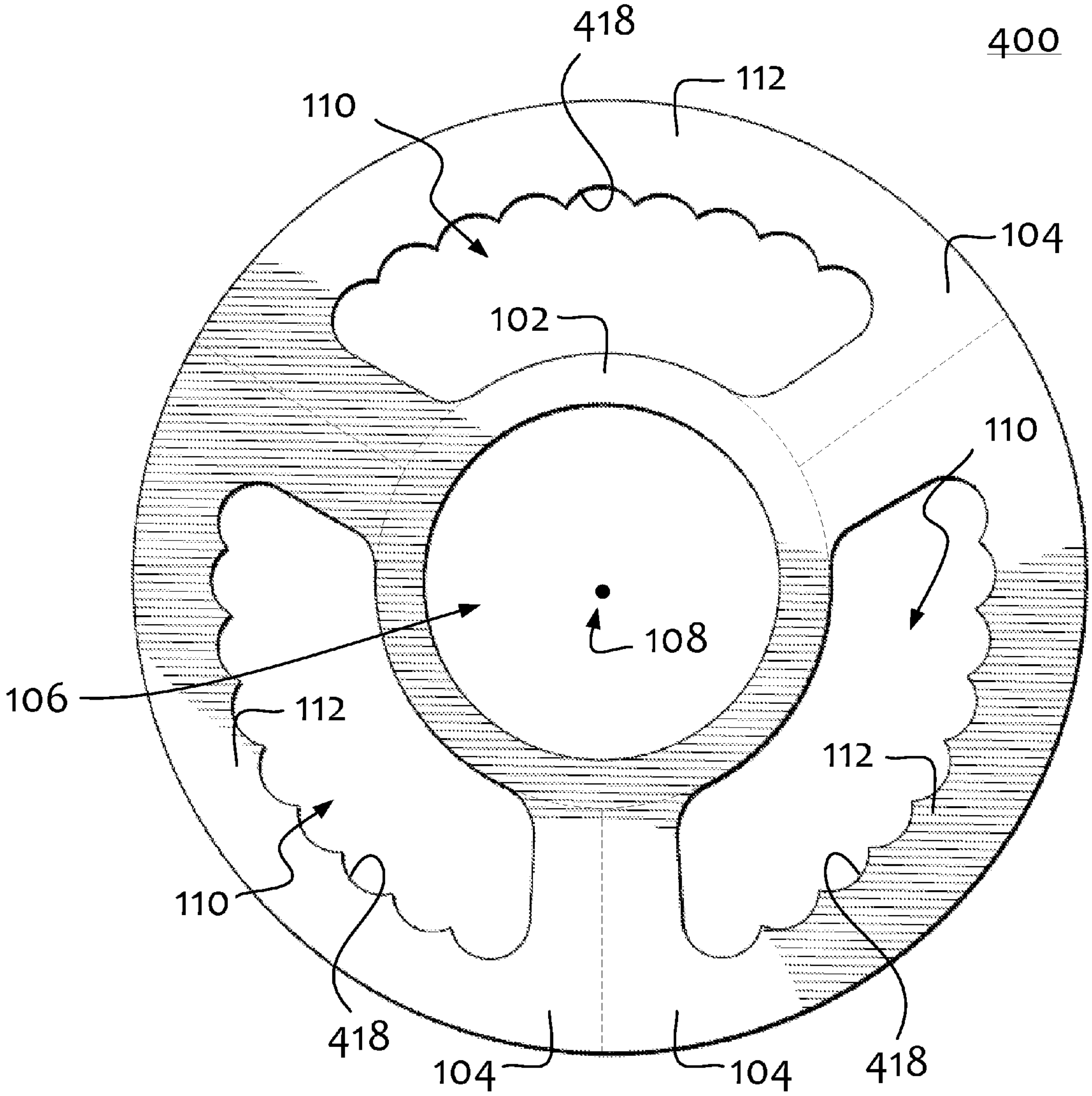
FIG. 11 is a top plan view of the handle of FIG. 10.

A removable ergonomic handle 400 for gripping a bottle is shown in a perspective view in FIG. 10 and in a top plan view in FIG. 11. The handle 400 includes a circumferential portion 102 and three arm portions 104 that are integral with the circumferential portion 102. The circumferential portion 102 of the handle 400 defines an opening 106 that is configured to receive therethrough, along an axis 108 of the opening 106, a container such as a baby bottle. The circumferential portion 102 of the handle 400 also is designed and dimensioned to surround and grip the baby bottle in an interference fit therewith when positioned on a body of the baby bottle.

Figure 2:
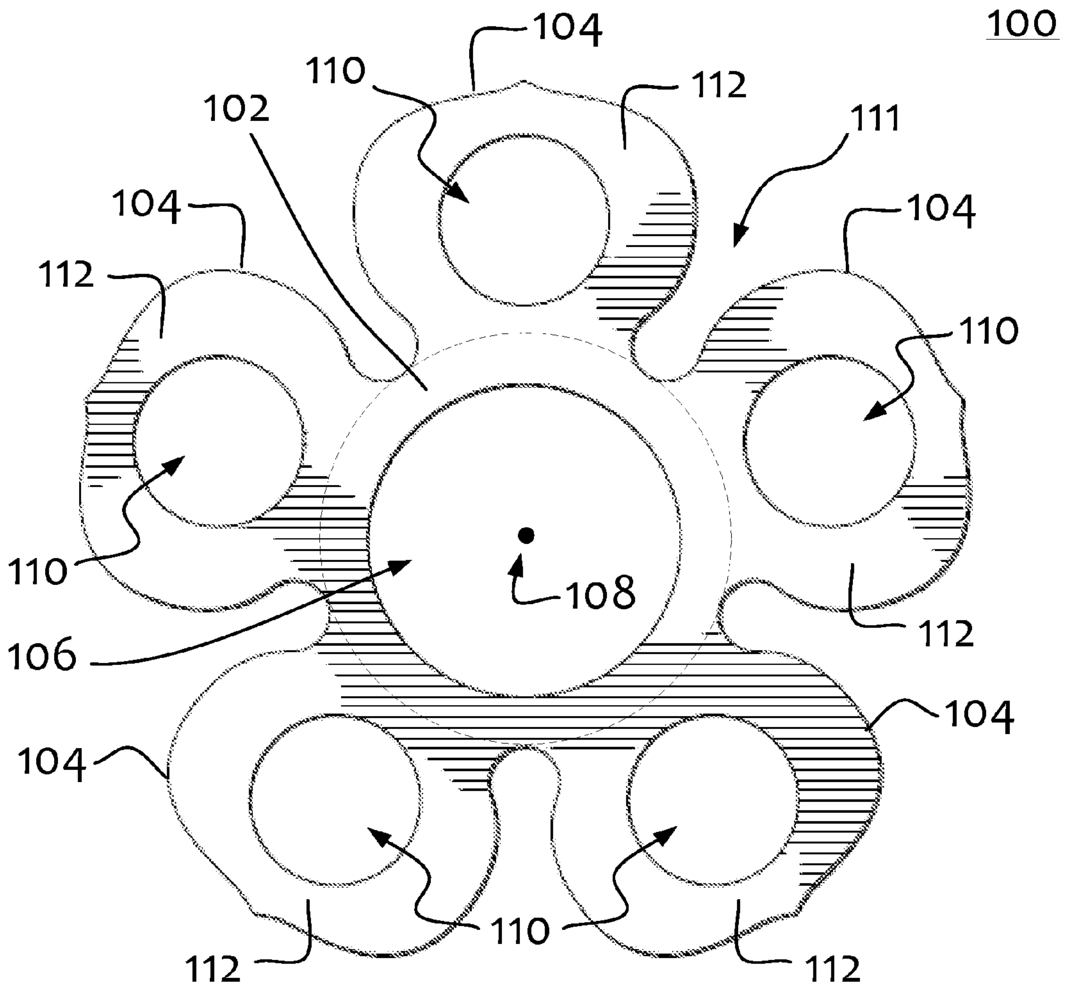
FIG. 2 is a top plan view of the handle of FIG. 1.

The arm portions 104 of the handle 400 extend from the circumferential portion 102 in a radial direction relative to the axis 108 of the opening 106 of the circumferential portion 102. The three arm portions 104 of the handle 400 also are integral with adjacent arm portions 104, as shown in FIG. 11, so as to define a continuous outer perimeter edge 416 of the handle 400. In contrast, for example, to the handle 100, none of the plurality of arm portions 104 of the handle 100 are integrally joined with adjacent arm portions 104, whereby a radially extending opening 111 (see FIG. 2) is defined between adjacent arm portions 104, which radially extending opening extends from the outer periphery of the handle 100 all the way to the circumferential portion 102 of the handle 100.

Additionally, each of the plurality of arm portions 104 defines an opening 110 that is configured to receive therethrough one or more fingers of hand for gripping engagement of the handle 100 by the hand, whereby the arm portion 104 defines a handle grip 112 for handling a container on which the handle 400 is removably mounted. Moreover, each arm portion 104 of the handle 400 defines a contoured edge 418 that is configured to individually receive fingers of the hand therein.

A sheet of material defines the circumferential portion 102 and the plurality of arm portions 104 of the handle 400. Preferably, the handle 400 is formed by cutting out the desired shape of the handle 400 from a sheet of Ethylene Vinyl Acetate, which is a preferred material because it is a lightweight, water resistant, moldable foam material. Because the handle 400 is cutout from a sheet of material, the handle 400 generally is planar in extent, having a relatively minute thickness compared to its overall length and width.

Alternatively, the handle 100 is made in a molding processes, such as an injection molding process.

Handle 400 generally resembles a steering wheel.

In use, the flexible material of the handle 400 allows the handle 400 to be install onto a baby bottle without removing a nipple ring from the baby bottle. In particular, the handle 400 may be pulled over the nipple ring and onto the body of the bottle and then slid down the body of the bottle to the desired height. In so doing, the circumferential portion 102 of the handle 400 is slightly expanded and stretched so as to provide an interference fit between the outside diameter of the bottle body and the opening 106 in the circumferential portion 102, whereby the handle 400 and bottle do not readily slide relative to one another during use. The preferred mounting position of the handle 400 is just below the nipple ring of the bottle. In the disposition of the handle 400 on the bottle, a plane of the handle 400 preferably is normal to the axis of the bottle. This puts the handle in an ergonomic position for easy capture and grasp by babies too young to hold a bottle themselves.

Figure 12:
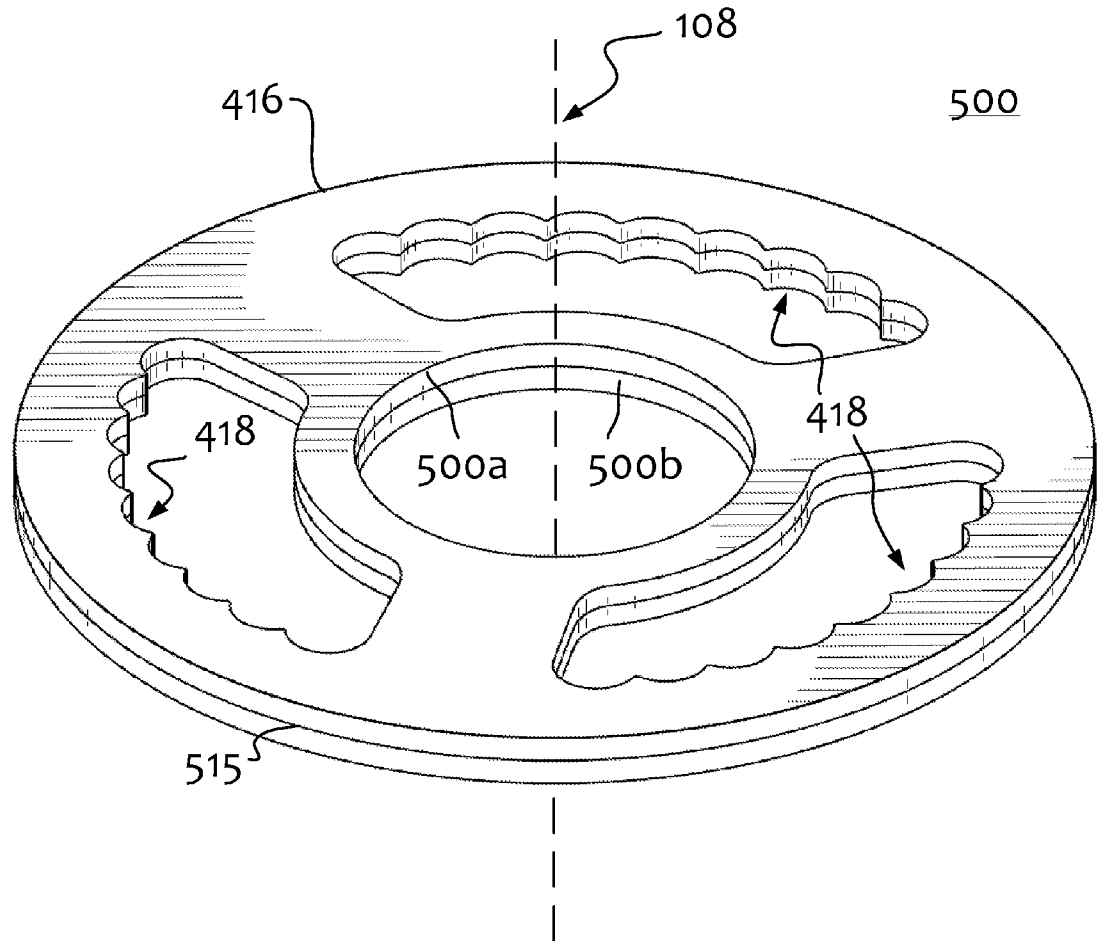
FIG. 12 is a perspective view of a removable ergonomic handle for gripping a bottle in accordance with a fifth embodiment of the present invention.
Figure 13:
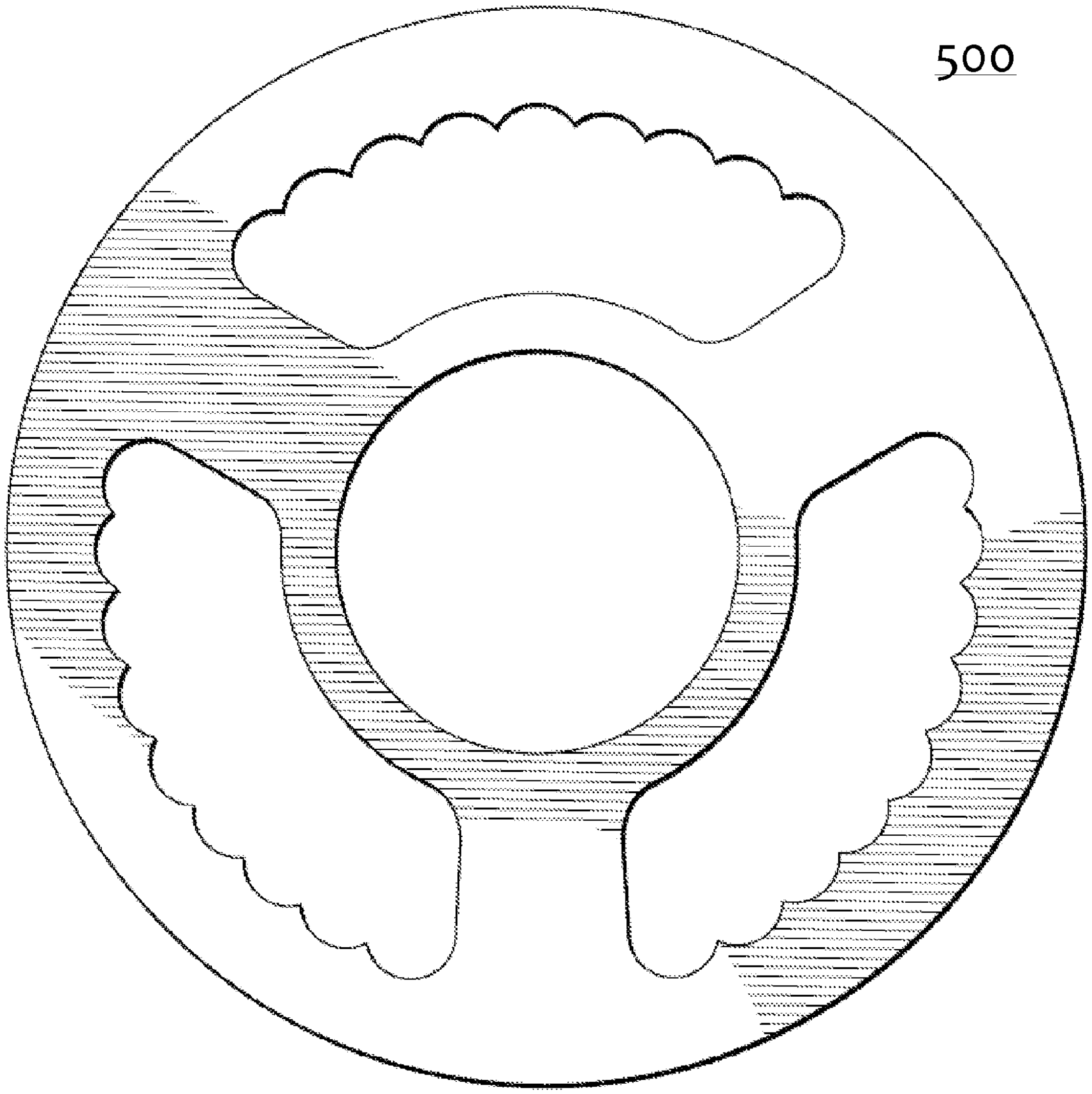
FIG. 13 is a top plan view of the handle of FIG. 12.

A removable ergonomic handle 500 for gripping a bottle that is shown in a perspective view in FIG. 12 and in a top plan view in FIG. 13 is generally similar in design and dimension to handle 400 and, therefore, the differences in structure will be described.

The principal different between handle 500 and handle 400 is that the circumferential portion 102 and the arm portions 104 of the handle 500 are defined by two sheets of material joined together along a plane that extends in a radial direction relative to the axis 108 of the opening 106 of the circumferential portion 102. In other words, the two sheets of the material define halves **500*a*,500*b* of the handle 500. Each half 500*a*,500*b* may be cut or stamped from ⅛" foam sheet of EVA, and the two halves 500*a*,500*b* can be laminated together to form the handle 500. A demarcation 515 line divides the handle 500 into two the halves 500*a*,500*b*. Each of the sheets of material preferably is Ethylene Vinyl Acetate, and each of the sheets of material preferably has a color that is different from the color of the sheet, whereby the handle 500 consists of halves having two different colors. The demarcation line 515 is intended to represent a border between the two halves 500*a*,500*b***.

Figure 14:
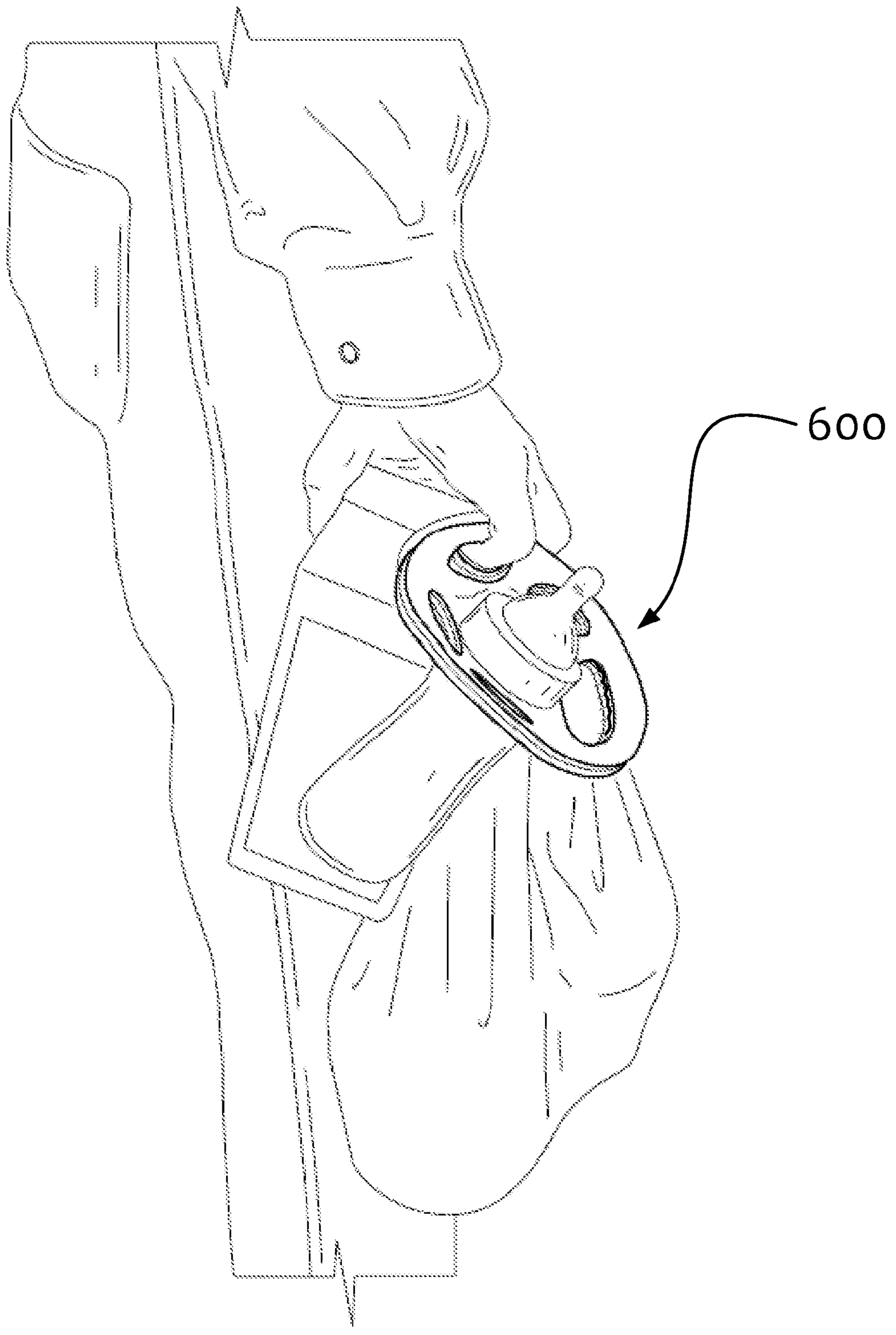
FIG. 14 is a perspective view of a removable ergonomic handle for gripping a bottle in accordance with a sixth embodiment of the present invention, wherein the handle is attached to a baby bottle proximate the nipple ring and is being carried by a caregiver.

A perspective view of yet a sixth removable ergonomic handle 600 for gripping a bottle is illustrated in FIG. 14, wherein the handle 600 is shown attached to a baby bottle proximate the nipple ring of the bottle and the handle 600 is being used to carry the baby bottle by a caregiver. The handle 600 is generally similar in design and dimension to handle 500 and principally differences only in that the handle 600 has a circumferential portion 102 and five arm portions rather than three as found in handle 500. Like handle 500, handle 600 also resembles a steering wheel.

Figure 15:
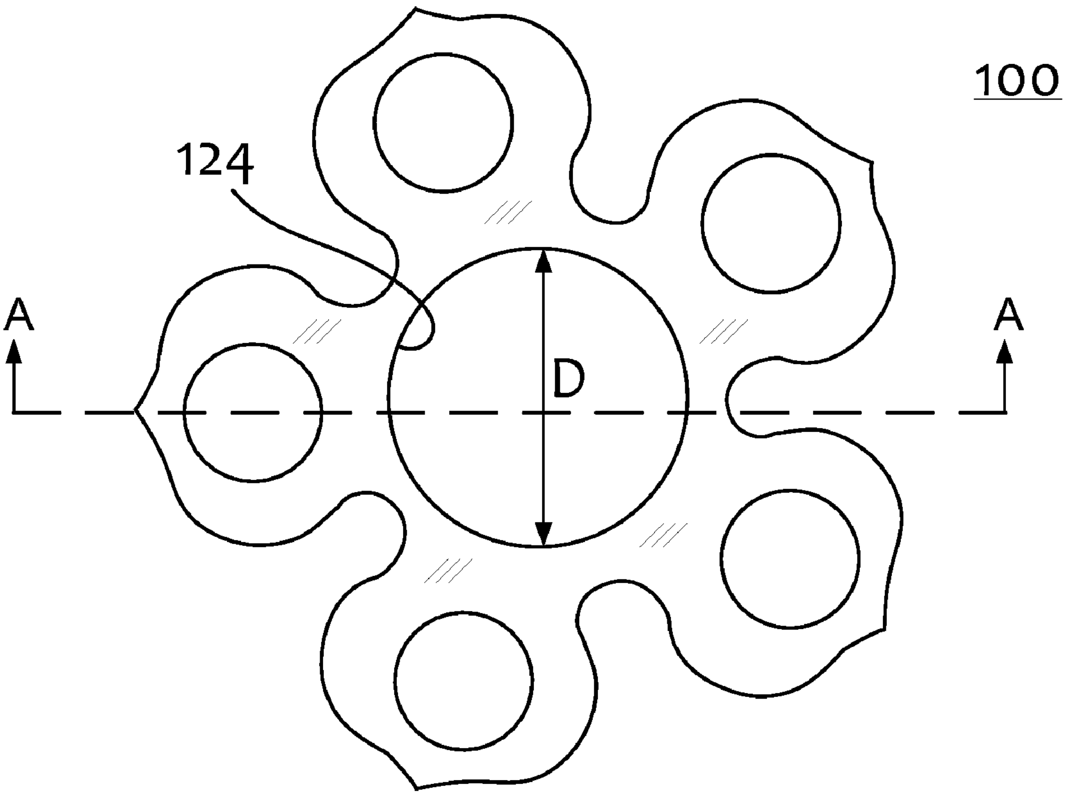
FIG. 15 is a top plan view of the handle of FIGS. 1-2.
Figure 16:
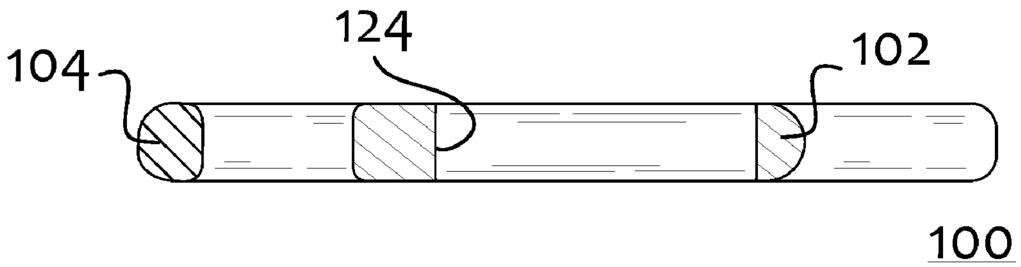
FIG. 16 is a cross-sectional view of the handle of FIG. 15 taken along the line A-A of FIG. 15.

FIG. 15 is a top plan view of a handle 100 and FIG. 16 is a cross-sectional view of the handle 100 taken along the line A-A of FIG. 15. As will be appreciated from FIGS. 15 and 16, the circumferential portion 102 defines a wall 124 having a smooth surface defining the inside circular diameter D of the opening 106 shown, for example, in FIG. 15. The wall 124 is configured to abut a container received through the opening 106 in an interference fit with the wall 124. Furthermore, the circumferential portion 102 of the handles 100 includes a radial thickness that is not uniform about the opening 106 as shown in FIG. 16; the radial thickness is greater in the area of the circumferential portion 102 from which the arm portion 104 extends as opposed to the thickness in the area of the circumferential portion 102 form which the arm portion 104 does not extend.

Figure 17:
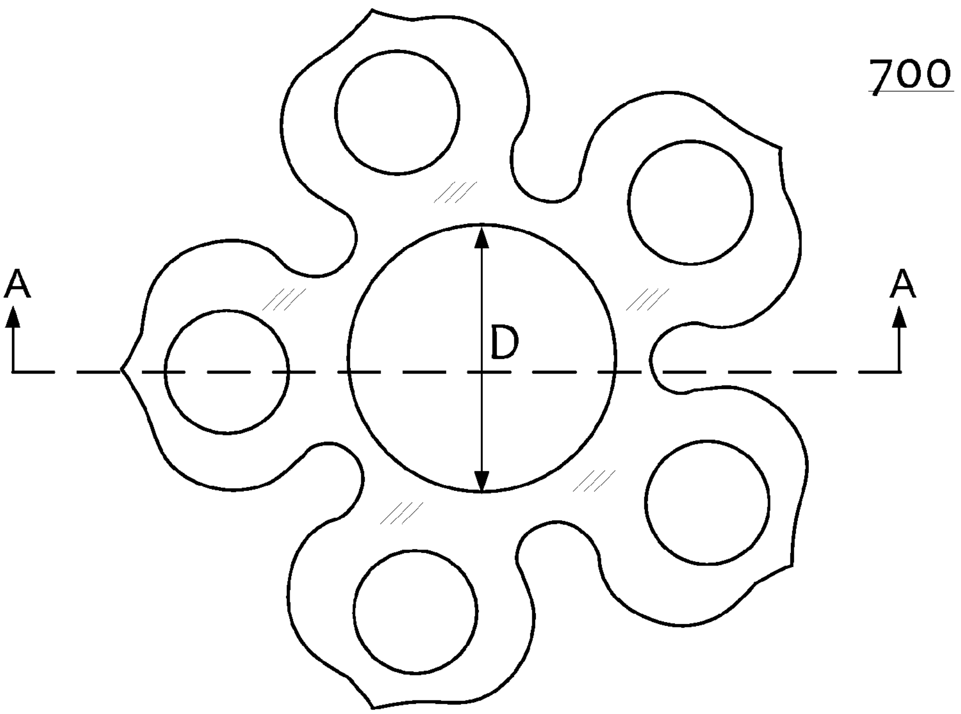
FIG. 17 is a top plan view of a removable ergonomic handle for gripping a bottle in accordance with a seventh embodiment of the present invention.
Figure 18:
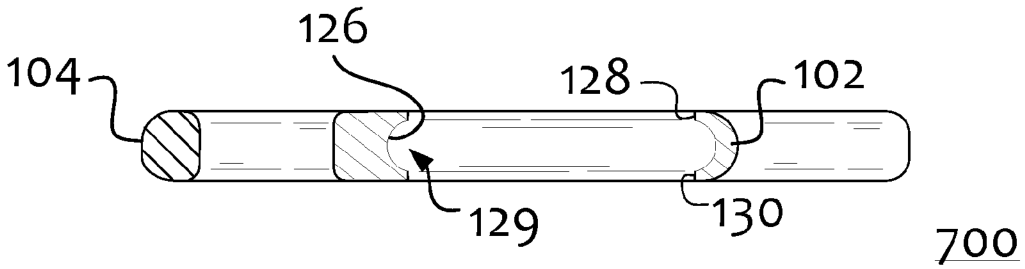
FIG. 18 is a cross-sectional view of the handle of FIG. 17 taken along the line A-A of FIG. 17.

In contrast to the handle 100 shown in FIGS. 15-16, another handle 700 in accordance with the invention is shown in FIGS. 17-18. Except as otherwise disclosed, the handle 700 includes the same structural design as the handle 100 and the similarities are not further described, reference being had to the foregoing description of the handle 100.

FIG. 17 is a top plan view of the handle 700 and FIG. 18 is a cross-sectional view of the handle 700 taken along the line A-A of FIG. 17. As will be appreciated from FIGS. 17 and 18, the circumferential portion 102 of the handle 700 defines a groove 126. The groove 126 defines an upper lip 128 and a lower lip 130 that is separated by a recess 129. In the handle 700, the upper and lower lips 128,130 define the inside circular diameter D of the opening 106. The groove 126 includes a rounded surface in the handle 700 as shown in FIG. 18. In use, the upper and lower lips 128,130 are believed to better enable the handle 700 to engage a container in an interference fit compared to the planar wall 124 of the circumferential portion 102 of the handle 100.

Figure 19:
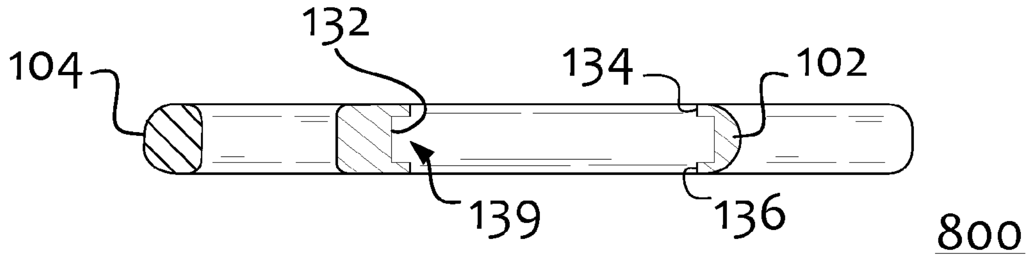
FIG. 19 is a cross-sectional view of a removable ergonomic handle for gripping a bottle in accordance with an eighth embodiment of the present invention.

In an alternative embodiment represented by handle 800 of FIG. 19, the handle 800 includes a groove 132 that has a squared-off, generally rectangular surface as shown in the cross-sectional view of FIG. 19. The groove 132 in this case defines an upper lip 134 and a lower lip 136 that are separated by a recess 139 that define the inside circular diameter of the opening of the handle 800 for receiving a container in an interference fit. In use, the upper and lower lips 134,136 are believed to better enable the handle 800 to engage a container in an interference fit compared to the planar wall 124 of the circumferential portion 102 of the handle 100. Except as otherwise disclosed, the handle 800 includes the same structural design as the handle 100 and the similarities are not described, reference being had to the foregoing description of the handle 100.

The structural design of each of the handles 100,200,300, 400,500,600,700,800 accomplishes several functions. For instance, each handle is designed for easy grabbing and gripping by the infant user during the feeding process as shown, for example, in FIGS. 6-8. It is believed that this provides bottle control to the infant at an earlier age than possible without the handle and this enable the infant to participate in the feeding process by assisting in stabilizing the bottle. It is furthermore believed that once some amount of bottle control is established, the infant will begin developing eye-hand-mouth coordination as the infant practices guiding the nipple into his or her mouth.

Each handle and, specifically, the geometry and dimensions of each handle, are designed such that the bottle handle—if dropped—will prop the nipple of a full bottle up above a threshold drip angle no matter how the bottle is oriented when dropped. The handle and, specifically, the geometry and dimensions of the handle, are designed such that the handle also serves as a bumper that extends around and proximate to the nipple and makes it less likely for the nipple to come into contact with unsanitary surfaces.

Each handle furthermore is designed so that a bottle can be easily grasped by as little as a pinky finger to aid a busy parent in carrying a multitude of other accessories with a bottle. Moreover, because of the mounting of the handle on the nipple side of the center of gravity of the bottle assembly, the bottle will hang in a nipple-up orientation as shown, for example, in FIG. 14, thereby eliminating spills in transport.

Each handle also can be slid to the bottom or middle of the bottle and used to prop the back of the bottle up on a reclined infant's chest for handsfree feeding. Multitasking parents are constantly propping bottles up with blankets or pillows. The handle functions as a built in prop. The handles 100,200,300, 700,800 are especially designed for such use as the distinct and separate arm portions define legs for stabilizing the propped bottle (in contrast, the rounded perimeter of the handles 400,500,600 actually may serve as a wheel permitting the bottle to roll off of a surface on which the bottle is propped).

Still yet, the form, feel and look of each handle makes it engaging entertainment for the baby while feeding. Moreover, the openings in the arm portions provide viewing windows for the baby during feeding.

It is believed that many benefits result from use of a handle in accordance with one or more embodiments of the invention.

For example, it is believed that use by an infant of a handle in accordance with one or more embodiments of the invention will lead to accelerated motor skill development by the infant, and especially in accelerated development in hand-eye-mouth coordination.

It is further believed that the handle in accordance with one or more embodiments of the invention will: assist in bottle stabilization and provide entertainment during feeding of a baby; help maintain sanitary feeding conditions by guarding against the nipple coming to rest in contact on the ground if and when the bottle may be dropped; avoid drips by keeping the a dropped bottle from resting in a nipple-down orientation (i.e., a dropped bottle will come to rest at a greater-than-threshold drip angle); provide a convenient handle for transport in a drip free orientation; and provide a handsfree prop for the bottle during feeding.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

For example, it is contemplated within the scope of the invention that the arm portions may form a non-circular pattern about the axis of the opening the circumferential portion for receiving a baby bottle. In this regard, the handle may form the shape of a bear or gingerbread man with a whole in each limb defining handlegrips. In any event, the radial extent of the arm portions should be great enough from the axis so that, when the bottle is tipped on its side, the handle will prop the bottle up above the threshold drip angle, with the bottle resting on the bottom rim of the bottle and the edge of the handle.

What is claimed is:

1. A handle for gripping a container, comprising:

(a) a circumferential portion defining an opening configured to receive therethrough, along an axis of the opening, a container such that the circumferential portion surrounds and grips the container in an interference fit therewith; and (b) a plurality of arm portions integral with the circumferential portion and extending therefrom in a radial direction relative to the axis of the opening of the circumferential portion, each of the plurality of arm portions defining an opening configured to receive therethrough one or more fingers of hand for gripping engagement of the handle by the hand, whereby the arm portion defines a handle grip for handling the container;

(c) wherein none of the plurality of arm portions are integrally joined with adjacent arm portions such that radially extending openings are defined between adjacent arm portions.

2. The handle of claim 1, wherein the handle consists of a generally planar body formed by the circumferential portion and the plurality of arm portions.

3. The handle of claim 1, wherein none of the plurality of arm portions are integrally joined with adjacent arm portions such that radially extending openings that extend to the circumferential portion are defined between adjacent arm portions.

4. The handle of claim 1, wherein the circumferential portion defines a groove that extends about the opening configured to receive the container therethrough, such that the circumferential portion includes upper and lower protracting lips separated by a recess for engaging the container in the interference fit.

5. The handle of claim 1, wherein a sheet of material defines the circumferential portion and the plurality of arm portions.

6. The handle of claim 5, wherein the material is Ethylene Vinyl Acetate.

7. The handle of claim 1, wherein the handle is cut from a sheet of lightweight, water resistant, moldable foam material that defines the circumferential portion and the plurality of arm portions.

8. The handle of claim 1, wherein the circumferential portion includes a radial thickness that is not uniform about the opening configured to receive the container therethrough.

9. The handle of claim 1, wherein circumferential portion and the plurality of arm portions are defined by two sheets of material joined together along a plane that extends in a radial direction relative to the axis of the opening of the circumferential portion.

10. The handle of claim 9, wherein each of the sheets of material is Ethylene Vinyl Acetate.

11. The handle of claim 9, wherein each of the sheets comprises a lightweight, water resistant, moldable foam material.

12. The handle of claim 9, wherein each of the sheets of material has a color different from the other sheet.

13. The handle of claim 1, wherein the handle is injection molded.

14. The handle of claim 1, wherein the handle is generally planar in extent.

* * * * *